(12) United States Patent
Boaz, V et al.

(10) Patent No.: US 12,539,345 B1
(45) Date of Patent: Feb. 3, 2026

(54) AIR FRESHENING DEVICE AND METHOD OF PREPARATION

(71) Applicants: William Carroll Boaz, V, Kaufman, TX (US); Samantha Boaz, Kaufman, TX (US)

(72) Inventors: William Carroll Boaz, V, Kaufman, TX (US); Samantha Boaz, Kaufman, TX (US)

( * ) Notice: Subject to any disclaimer, the term of this patent is extended or adjusted under 35 U.S.C. 154(b) by 446 days.

(21) Appl. No.: 18/109,104

(22) Filed: Feb. 13, 2023

Related U.S. Application Data

(60) Provisional application No. 63/349,449, filed on Jun. 6, 2022.

(51) Int. Cl.
*A61L 9/12* (2006.01)
*A61L 9/012* (2006.01)

(52) U.S. Cl.
CPC ............... *A61L 9/12* (2013.01); *A61L 9/012* (2013.01)

(58) Field of Classification Search
CPC ....................................................... A61L 9/12
See application file for complete search history.

(56) References Cited

U.S. PATENT DOCUMENTS

| | | | | |
|---|---|---|---|---|
| 2,962,219 A | * | 11/1960 | Curran | A01M 1/2055 73/61.41 |
| 2008/0070025 A1 | * | 3/2008 | Pavlin | C08G 18/603 524/612 |
| 2023/0044140 A1 | * | 2/2023 | Rost | A61L 9/05 |

* cited by examiner

*Primary Examiner* — Kevin Joyner
(74) *Attorney, Agent, or Firm* — Richard Eldredge; Leavitt Eldredge Law Firm

(57) ABSTRACT

An air refreshening device for providing customizable, long-lasting fragrance that is adaptable for use in various environments is disclosed. The air refreshening device includes a predetermined amount of cure plastic beads; a predetermined amount of oil; a predetermined amount of mica powder; a string; and a container. The predetermined amount of cure plastic beads, the predetermined amount of oil, and the predetermined amount of mica powder are combined to form a homogenous mixture. The homogenous mixture is treated to form an air freshening product. The air freshening product is placed into the container to create the air refreshening device.

2 Claims, 2 Drawing Sheets

AIR FRESHENING DEVICE AND METHOD OF PREPARATION

BACKGROUND

1. Field of the Invention

The present invention relates generally to air fresheners, and more specifically to air freshening device that utilizes a plurality of beads for providing long lasting fragrance.

2. Description of Related Art

Air fresheners are well known in the art for their use to provide fragrance in an environment. Such environments include vehicles, bathrooms, locker rooms, bedrooms, etc. In particular, typical air fresheners for car use only are clipped on a car air vent or hung from rear view mirrors or other objects. Other air fresheners are designed to rest on a table, shelf, or other level surface.

One of the problems commonly associated with conventional air fresheners is their limited efficiency. For example, conventional air fresheners release fragrance uncontrollably which depletes its fragrance properties quickly. This causes the user to acquire replacement air fresheners more often and can be expensive.

Accordingly, although great strides have been made in the area of air fresheners, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
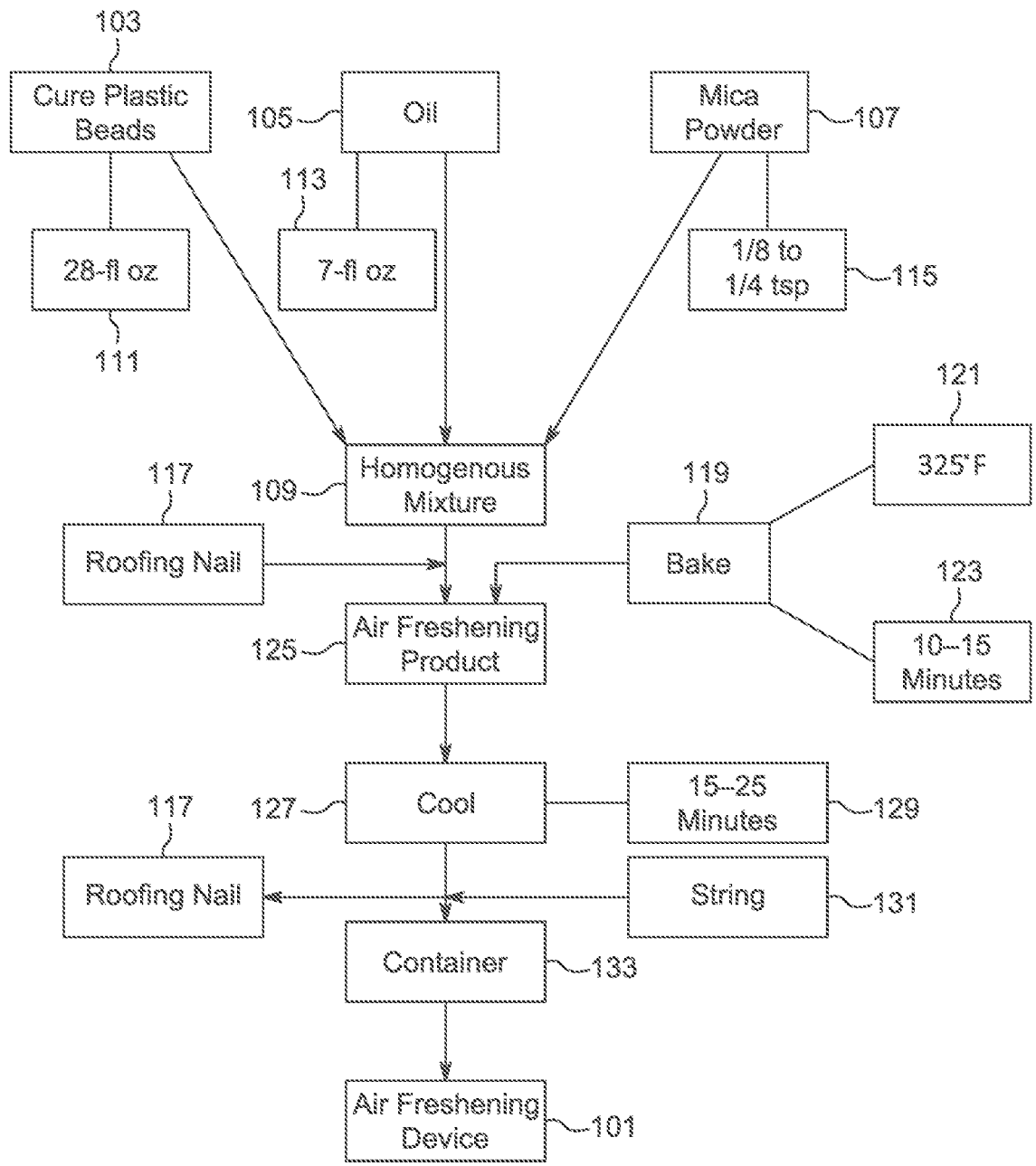
FIG. 1 is a schematic representation an air freshening device in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional air fresheners. Specifically, the present provides for an air freshener that is customizable, long-lasting, and is adaptable for use in various environments. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic representation of an air freshening device 101 in accordance with a preferred embodiment of the present application. It will be appreciated that the air freshening device 101 overcomes one or more of the above-listed problems commonly associated with conventional air fresheners.

In the contemplated embodiment, the air freshening device 101 includes an amount of cure plastic beads 103, an amount of oil 105, an amount of mica powder 107. The cure plastic beads 103 serves as a vehicle to absorb the oil 105 and the mica powder 107. The oil 105 provides for fragrance, and the mica powder 107 provides for color. It should be appreciated that the oil 105 and the mica powder 107 can vary to achieve desired fragrance and color.

In the preferred embodiment, a homogenous mixture 109 is made from combining about 28-fl oz 111 of cure plastic beads 103, about 7-fl oz 113 of oil 105, and about ⅛ to about ¼-tsp 115 of mica powder 107. A roofing nail 117 is inserted into the homogenous mixture 109; this combination is baked 119 at about 325° F. 121 for about 10 to about 15 minutes 123, creating an air freshening product 125. The roofing nail 117 creates a hole within the homogenous mixture 109 during baking 119. After baking 119, the air freshening product 125 is cooled 127 for about 15 to about 25 minutes 129. After cooling 125, the roofing nail 117 is removed from the air freshening product 125 and a string 131, measuring preferably about 13 inches, is inserted through the hole created by the roofing nail 117. The string 131 is tied at the bottom and at the top of the air freshening product 125. The air freshening device 101 is then made from placing the tied air freshening product 125 within a container 133, preferably a 6×6 inch or 6×9 inch polypropylene plastic bag.

In the preferred embodiment, the air freshening device 101 has a width of at least about 2⅜-inches and a length of at most about 6¾-inches. The string 131 has a thickness of about 1.5-millimeters for providing greater tensile strength, thereby improving the overall performance of the air freshening device 101.

Also, in the preferred embodiment, the overall percentage of oil 105 in the air freshening device 101 includes about 7.075% to about 8.4% depending on viscosity and the active and/or inactive ingredients of oil 105, thereby creating an oil-bead ratio of about 4:1 to about 5:1.

It is contemplated and will be appreciated that a mold can be used to shape the homogenous mixture 109 during baking 119, thereby forming the air freshening product 125 into a desired shape.

In addition, it is contemplated and will be appreciated that the order in which the cure plastic beads 103, oil 105, and the mica powder 107 are combined to form the homogenous mixture 109 can vary.

It should also be appreciated that one of the unique features believed characteristic of the present application is that the air freshening device 101 is designed to be use in any environment as desired, thereby providing for improved user convenience.

Figure 2:
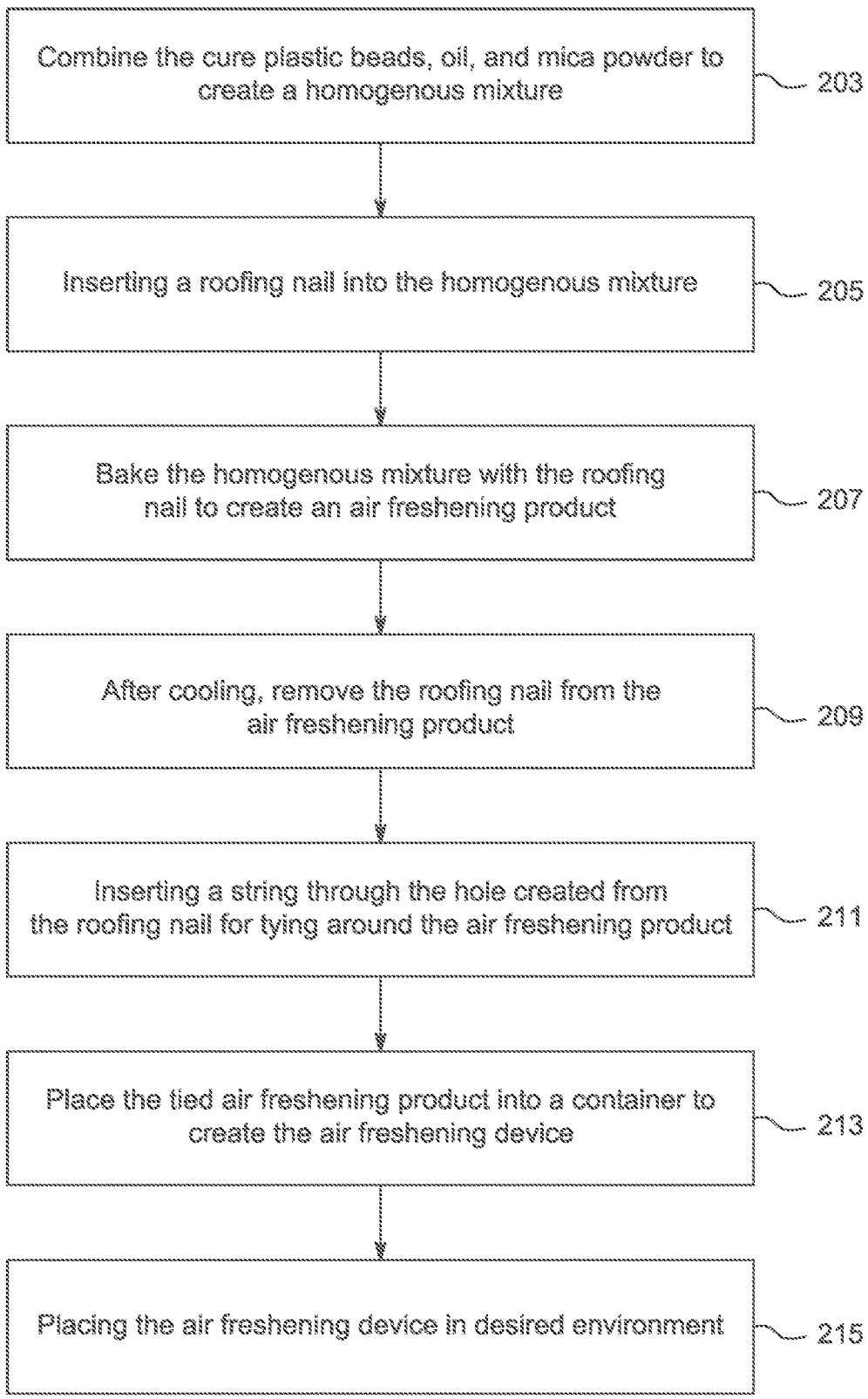
FIG. 2 is a flowchart of a method of a method of preparing the air freshening device of FIG. 1.

In FIG. 2, a flowchart 201 depicts a method of preparing the air freshening device 101. First, the cure plastic beads, the oil, and the mica powder are combined to create a homogenous mixture using the amounts discussed above, as shown with box 203. Next, after a roofing nail is inserted into the homogenous mixture, the combination is baked to create an air freshening product using the temperature and timing discussed above, as shown with boxes 205, 207. Next, the air freshening product is cooled, and the roofing nail is removed therefrom, as shown with box 209. Next, a string is inserted through the hole created from the roofing nail for tying around the air freshening product, as shown with box 211. Then, the air freshening product is placed into a container to create the air freshening device, as shown with box 213. The air freshening device 101 can be placed in a desired environment, as shown with box 215.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An air freshening device, comprising:
   a predetermined amount of cure plastic beads;
   a predetermined amount of oil;
   a predetermined amount of mica powder;
   a string; and
   a container;
   wherein the predetermined amount of cure plastic beads, the predetermined amount of oil, and the predetermined amount of mica powder are combined into a homogenous mixture;
   wherein the homogenous mixture is baked with a roofing nail to form an air freshening product, the roofing nail forming a hole within the air freshening product;
   wherein the string is inserted through the hole upon the removal of the roofing nail and tied around a top portion and a bottom portion of the air freshening product; and
   wherein the air freshening product is placed into the container;
   wherein the air freshening device has a width of at least about 2⅜-inches and a length of at most about 6¾-inches;
   wherein the predetermined amount of cure plastic beads is about 28-fl oz;
   wherein the predetermined amount of oil is about 7-fl oz;
   wherein the predetermined amount of cure plastic beads and predetermined amount of oil creates a ratio of about 4:1 to about 5:1;
   wherein the predetermined amount of mica powder is about ⅛- to about ¼-tsp;
   wherein the container is measured about 6×6-inches or about 6×9-inches; and
   wherein the string is measured about 13-inches and a thickness of about 1.5-millimeters.

2. An air freshening device, comprising:
   about 28-fl oz of cure plastic beads;
   about 7-fl oz amount of oil;
   about ⅛- to about ¼-tsp of mica powder;
   a string measured about 13-inches; and
   a container measured about 6×6-inches or about 6×9-inches;
   wherein the about 28-fl oz of cure plastic beads, the about 7-fl oz of oil, and the about ⅛- to about ¼-tsp of mica powder are combined into a homogenous mixture;
   wherein the about 28-fl oz of cure plastic beads and the 7-fl oz of oil creates a ratio of about 4:1 to about 5:1;
   wherein the homogenous mixture is baked with a roofing nail to form an air freshening product, the roofing nail forming a hole within the air freshening product;
   wherein the string is inserted through the hole upon the removal of the roofing nail and tied around a top portion and a bottom portion of the air freshening product;
   wherein the air freshening product is placed into the container; and
   wherein the air freshening device has a width of at least about 2⅜-inches and a length of at most about 6¾-inches.

* * * * *